(12) United States Patent
McCarthy et al.

(10) Patent No.: US 8,752,121 B2
(45) Date of Patent: Jun. 10, 2014

(54) SYSTEM AND METHOD FOR DISPLAYING TELEVISION PROGRAM INFORMATION ON A REMOTE CONTROL DEVICE

(75) Inventors: Mary McCarthy, San Antonio, TX (US); Bryan M. Cardenas, Helotes, TX (US); Leanne Blanco, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 737 days.

(21) Appl. No.: 12/163,085

(22) Filed: Jun. 27, 2008

(65) Prior Publication Data

US 2009/0328097 A1    Dec. 31, 2009

(51) Int. Cl.
*H04N 7/16*     (2011.01)
*H04N 5/445*    (2011.01)
*H04N 5/44*     (2011.01)

(52) U.S. Cl.
USPC ............... 725/139; 725/39; 725/43; 725/151; 348/734

(58) Field of Classification Search
USPC ......................................................... 725/80
See application file for complete search history.

(56) References Cited

U.S. PATENT DOCUMENTS

| 6,097,441 | A * | 8/2000 | Allport .......................... 348/552 |
| 6,862,741 | B1 * | 3/2005 | Grooters .......................... 725/39 |
| 7,782,309 | B2 * | 8/2010 | Janik .............................. 345/173 |
| 7,948,476 | B2 * | 5/2011 | Goto et al. ..................... 345/173 |
| 2002/0042915 | A1 * | 4/2002 | Kubischta et al. .............. 725/38 |
| 2003/0035074 | A1 | 2/2003 | Dubil et al. |
| 2004/0158854 | A1 * | 8/2004 | Nagasawa et al. .............. 725/38 |
| 2004/0168187 | A1 | 8/2004 | Chang |
| 2006/0290823 | A1 | 12/2006 | Kondo |
| 2007/0136749 | A1 * | 6/2007 | Hawkins et al. ................ 725/38 |
| 2009/0049475 | A1 * | 2/2009 | Green et al. .................... 725/44 |
| 2011/0265115 | A1 * | 10/2011 | Alten .............................. 725/32 |

OTHER PUBLICATIONS

"Remote Controls," Katherine Boehret, Tech Briefing from the New York Times Section D2 of the Austin-American Statesman Newspaper, article review for product "ESPN the Ultimate Remote," dated Jun. 9, 2008.

* cited by examiner

*Primary Examiner* — Chris Parry
(74) *Attorney, Agent, or Firm* — Guntin & Gust, PLC; Jay H. Anderson

(57) ABSTRACT

A remote control device comprising a display, a receiver module, and a detection module. The receiver module is configured to receive, from a set-top box device, information about content currently displayed on a screen connected to the set-top box device, and configured to display the information on the display. The detection module is in communication with the display. The detection module is configured to determine a button that is pressed on the remote control device, and configured to display an output on the display corresponding to the button and indicating that the button has been pressed.

14 Claims, 8 Drawing Sheets

SYSTEM AND METHOD FOR DISPLAYING TELEVISION PROGRAM INFORMATION ON A REMOTE CONTROL DEVICE

FIELD OF THE DISCLOSURE

The present disclosure generally relates to communications networks, and more particularly relates to a system and method for displaying television program information on a remote control device.

BACKGROUND

Remote controls are common for set-top box devices, televisions, digital video disc (DVD) players, and the like. Some remote controls, known as universal remote controls, can be programmed to function with multiple target devices. In most cases, remote controls typically send an infrared (IR) control signal via an IR transmitter. The target device uses the IR control signal to determine what command function the user is requesting.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
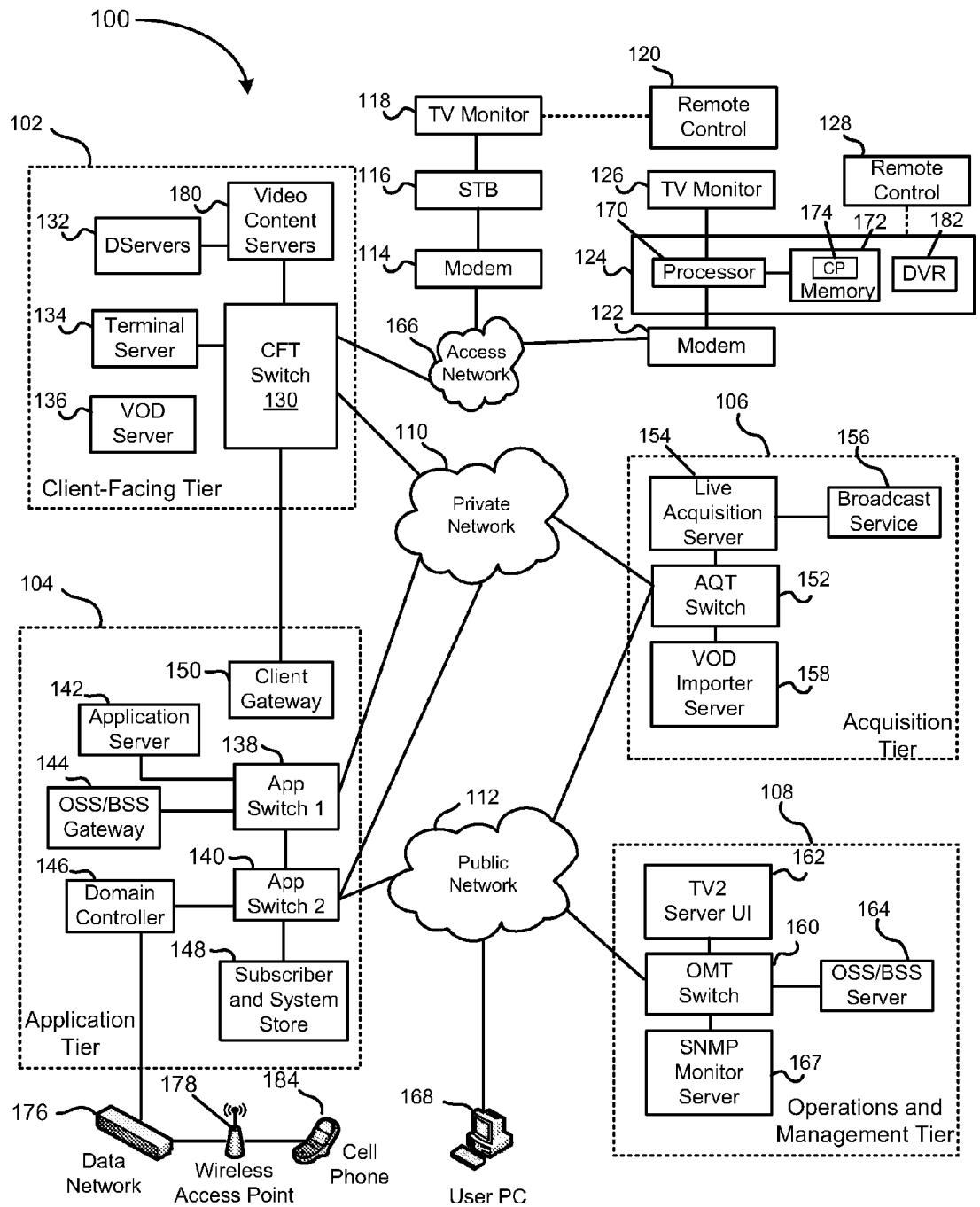
FIG. 1 is a block diagram illustrating an Internet Protocol Television (IPTV) network.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136. The CFT switch 130 can also be coupled to video content servers 180.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating the second set-top box device with a user account, or with any combination of these.

The set-top box computer program 174 can contain instructions to receive many types of user preferences from the domain controller 146 via the access network 166. For example, the set-top box computer program 174 can include instructions to receive a request to record at least one television program at a video content storage module such as a digital video recorder (DVR) 182 within the second set-top box device 124. In this example embodiment, the set-top box computer program 174 can include instructions to transmit the request to the DVR 182, where the television program(s) are recorded. In an illustrative embodiment, the set-top box computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
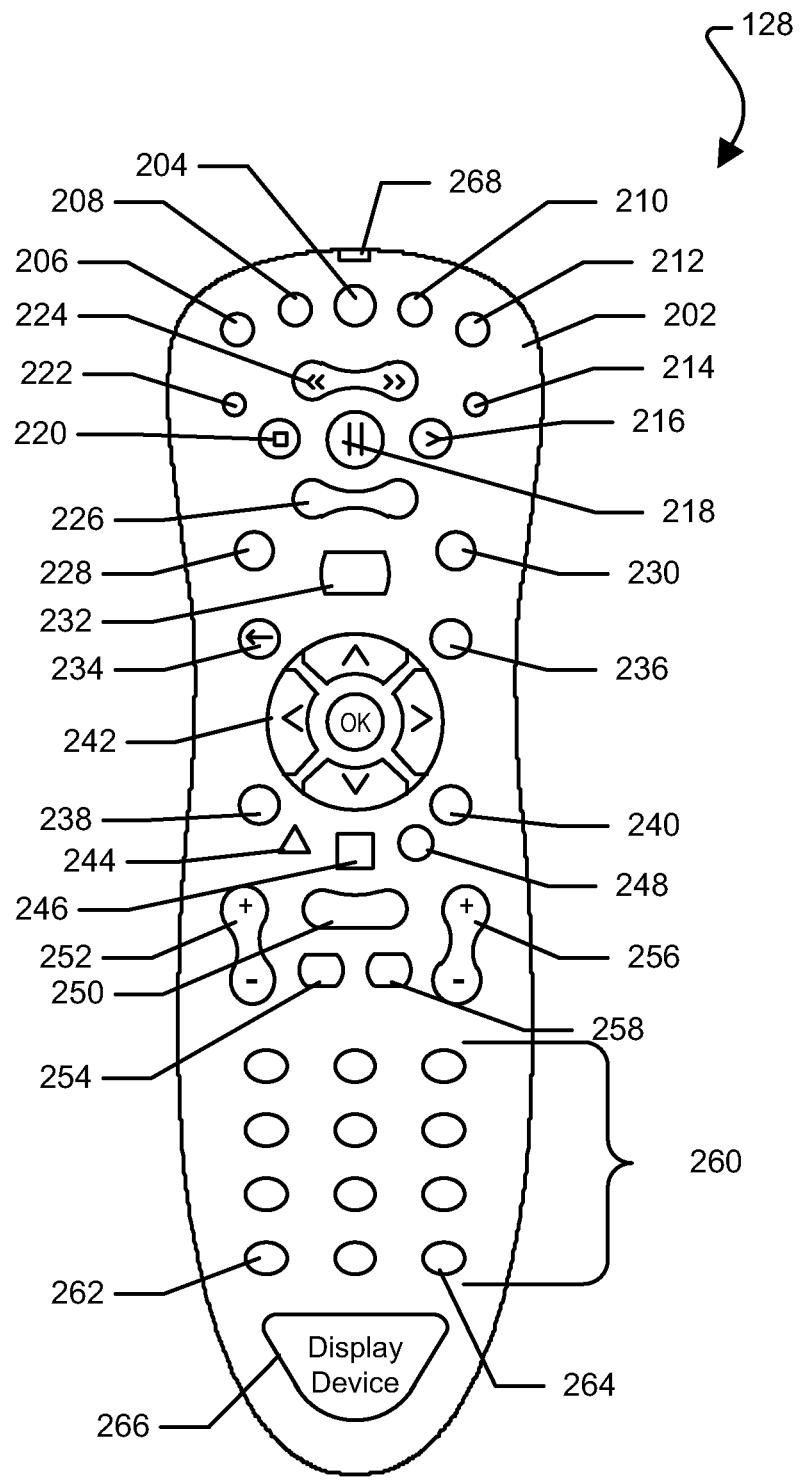
FIG. 2 is a plan view of a remote control device.

FIG. 2 shows the remote control device 128 including a housing 202 having a plurality of buttons. For example, the remote control device 128 can include a power button 204, an IPTV button 206, a television (TV) button 208, a digital video disc (DVD) button 210, and an auxiliary (AUX) button 212. When the IPTV button 206 is pressed, the remote control device 128 can be used to control the set-top box device 124. When the TV button 208 is pressed, the remote control device 206 can be used to control the display device 126 connected to the set-top box device 124. When the DVD button 210 is pressed, the remote control device 128 can be used to control a DVD player connected to the display device 126 or to the set-top box device 124. Additionally, when the AUX button 212 is pressed, the remote control device 128 can be used to control an auxiliary device connected to the display device 126 or to the set-top box device 124. For example, the auxiliary device can be a compact disc (CD) player, a video cassette recorder (VCR), an audio receiver, or some other home entertainment device.

The remote control device 128 can include a TV/VIDEO button 214 that can be used to toggle between inputs for display, such as between television content and video content from the DVR or the DVD player. The remote control device 128 can also include a PLAY button 216, a PAUSE button 218, a STOP button 220, a RECORD button 222, a rewind (REW)/fast forward (FF) button 224, and a replay/slow forward (FWD) button 226. These buttons can be used to control the content received at the set-top box device 124 or video content received from a DVD player. One or more of these buttons can also be programmed to control the CD player, the VCR, or some other home entertainment device. The remote control device 128 can also include a VIDEO ON DEMAND button 228 and a RECORDED TV button 230. The VIDEO ON DEMAND button 228 can be pressed in order to access VOD content available via the set-top box device 124. The RECORDED TV button 230 can be pressed in order to access television content recorded at the set-top box device 124.

The remote control device 128 can also include a MENU button 232, a BACK button 234, a GO INTERACTIVE button 236, an EXIT button 238, and an INFO button 240. The MENU button 232 can be used to access a menu of features provided by the set-top box device 124. Further, the INFO button 244 can be used to access an information window provided by the set-top box device 124. The GO INTERACTIVE button 236 can be used to access interactive content provided by the IPTV system. The remote control device 128 can include a directional keypad 242. The directional keypad 242, the BACK button 234, and the EXIT button 238 can be used to navigate within the various content windows provided by the set-top box device 124. The remote control device 128 can also include a triangular A button 244, a square B button 246, and a round C button 248. The A button 244, the B button 246, and the C button 248 can be used to make various selections when navigating within a menu screen, an information screen, or some other screen provided by the set-top box device 124.

The remote control device 128 can further include a GUIDE button 250 that can be pressed in order to access an electronic programming guide for the content provided by the set-top box device 124. Moreover, the remote control device 128 can include a volume (VOL) up/down button 252, a MUTE button 254, a channel/page (CH/PG) up/down button 256, and a LAST button 258. The VOL button 252 can be used to control the volume of the set-top box device 124, a TV, a CD player, etc. The MUTE button 254 can be used to mute audio content provided by an set-top box device 124, a TV, a CD player, etc. The CH/PG button 256 can be used to change the channel at the set-top box device 124 or navigate from page-to-page within a content guide provided by the set-top box device. The LAST button 258 can be used to return to the last channel viewed by the user at the set-top box device 124.

The remote control device 128 can include a numerical keypad 260 having a plurality of buttons that are individually numbered 1, 2, 3, 4, 5, 6, 7, 8, 9, and 0. The numerical keypad 260 is configured similar to a telephone keypad and each individual button also includes a portion of the alphabet. The 2 button includes ABC, the 3 button includes DEF, the 4 button includes GHI, the 5 button includes JKL, the 6 button includes MNO, the 7 button includes PQRS, the 8 button includes TUV, and the 9 button includes WXYZ. The 0 button can also be used as a SPACE button. In a particular embodiment, the numerical keypad 260 can be used to input a specific channel number. Further, the numerical keypad 260 can be used to input text to the IPTV system, when necessary, using the triple tap method well known in the art. The numerical keypad 260 can also include a DELETE button 262 and an ENTER/ZOOM button 264.

The remote control device 128 can also include a display 266 and an infrared (IR) transceiver 268. Further details of the remote control device 128 are described in U.S. patent application Ser. No. 11/847,120, the disclosure of which is hereby incorporated by reference.

Figure 3:
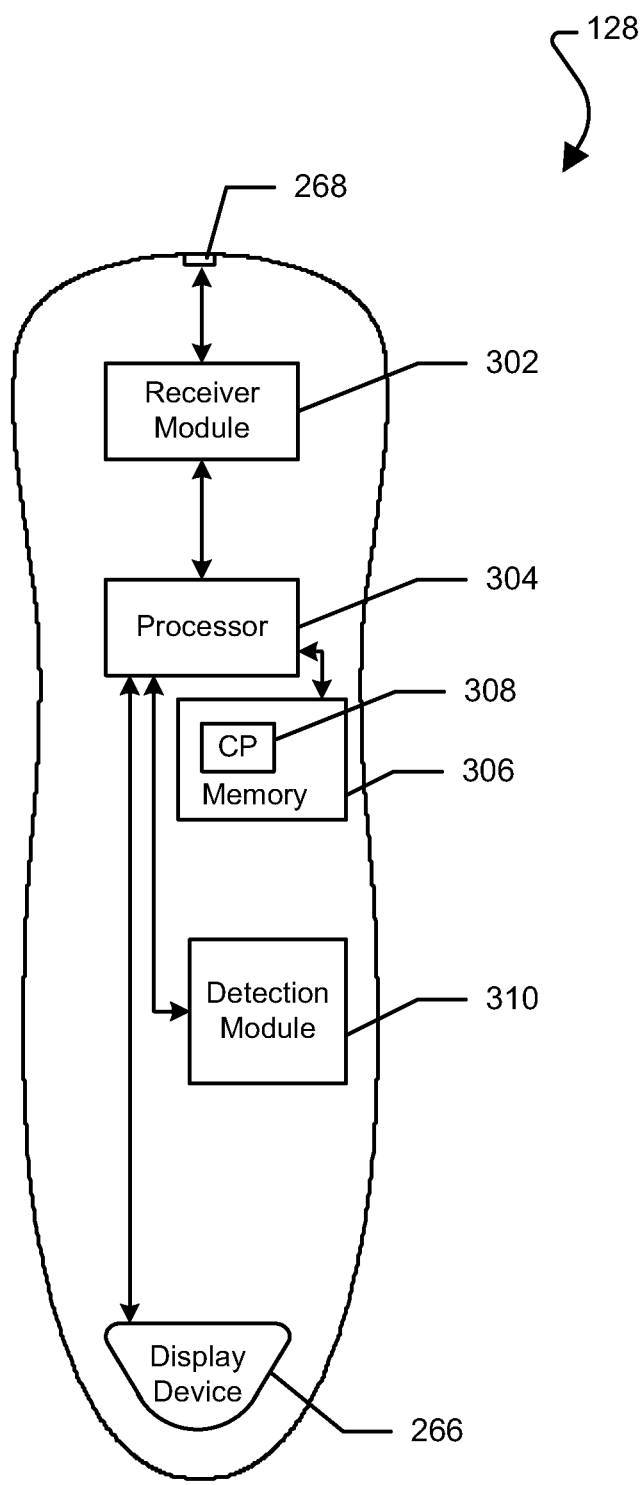
FIG. 3 is a block diagram of a plurality of components in the remote control device.

FIG. 3 shows a block diagram of a portion of the components within the remote control device 128 including a receiver module 302, a processor 304, a memory device 306 having a computer program 308, and a detection module 310. The receiver module 302 is in communication with the IR transceiver 268 and with the processor 304. The processor 304 is in communication with the memory device 306, with the detection module 310, and with the display 266. The detection module 310 is in communication with the display 266.

The IR transceiver 268 can either be only an IR transmitter for sending control signals to the set-top box 124, or can be an IR transmitter/receiver that can both send and receive IR signals. The receiver module 302 can receive the IR control signals from the IR transceiver 268. Additionally, the receiver module 302 can be a radio frequency device that can communicate with the set-top box device 124 using radio frequency signals. The receiver module 302 can be a Bluetooth device, an ultra high frequency (UHF) device, and the like. The control signals received from the set-top box device 124 can be television program information associated with a television program that is currently being displayed on the display device 126, such as a television screen. The television program information can include a broadcast channel number, a broadcast channel name, a television program title, and the like.

The processor 304 can process and can output the television program information to the display 266, which can be a liquid crystal (LCD) display and the like. The detection module 310 can determine when a button is pressed on the remote control device 128 and send an output corresponding to the button pressed to the display 266. For example, if the guide button 250 is pressed, a 'GUIDE' text string can be output to the display 266 and can be viewed by the user.

Figure 4:
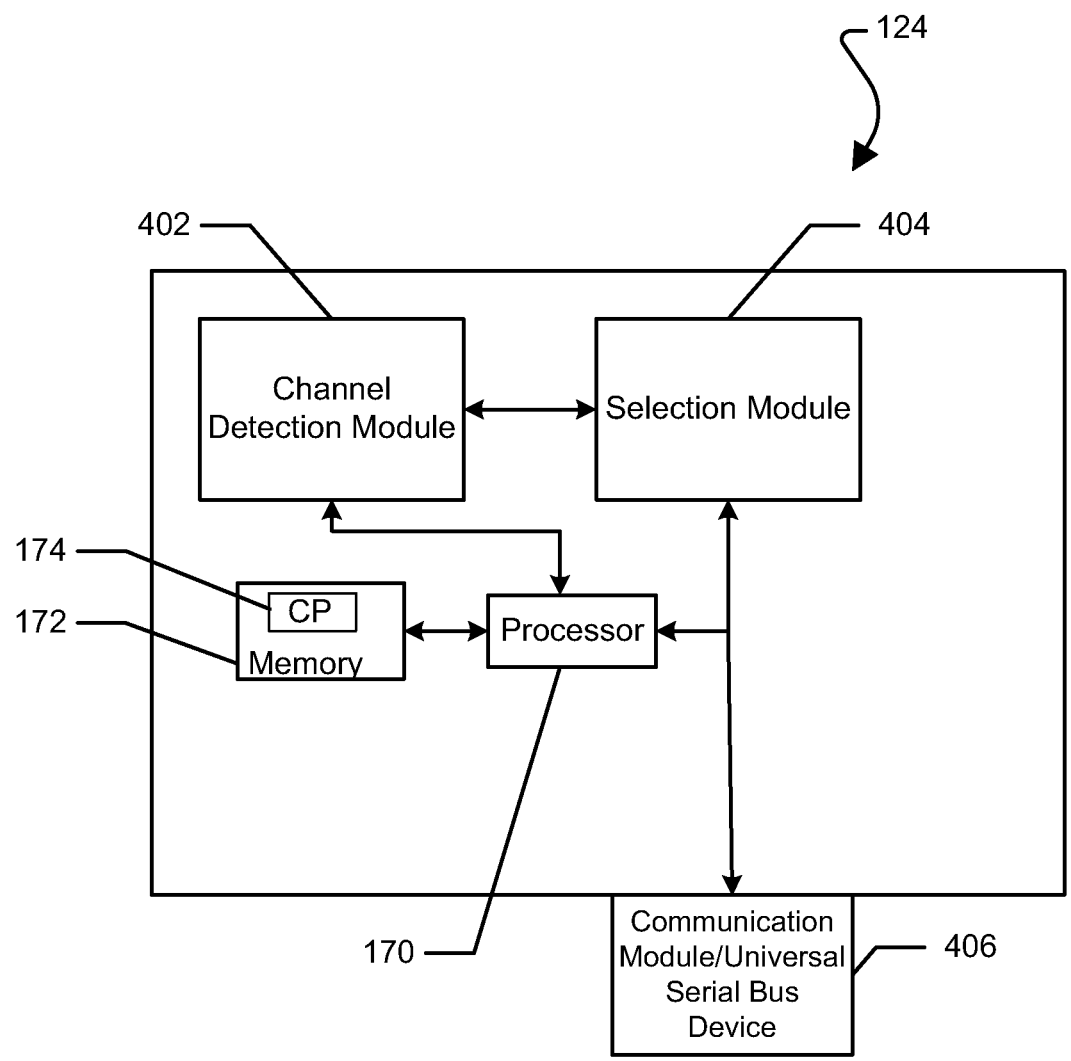
FIG. 4 is a block diagram of a plurality of components in a set-top box device.

FIG. 4 shows a block diagram of a portion of the components within the set-top box device 124 including a channel detection module 402, a selection module 404, and a communication module, such as a universal serial bus (USB) device 406. The channel detection module 402 is in communication with the selection module 404 and with the processor 170. The selection module is in communication with the processor 170. The USB device 406 is in communication with the processor 170. The USB device 406 can be a radio frequency device, an IR device, a UHF device, a Bluetooth device, and the like. The processor 170 is in communication with the set-top box memory device 172, which includes the computer program 174 executable by the processor 170.

The channel detection module 402 can determine a currently displayed television program and the associated television program information. The channel detection module 402 can send the television program information to the remote control device 128 via the USB device 406. In one embodiment, the set-top box device 124 can transmit the television program information without having the USB device 406 connected to the set-top box device. As the set-top box 124 receives a control signal from the IR transceiver 268 requesting a change in the television program currently being displayed, the channel detection module 402 can determine a title or other descriptive information about the new television program, and send that new television program information to the remote control device 128.

The selection module 404 can determine if the user highlights a television program listed in an electronic programming guide output to the display device 126 by the set-top box device 124. The selection module 404 can also determine the television program information associated with the highlighted television program, and send the television program information to the remote control device 128 via the USB device 406.

Figure 5:
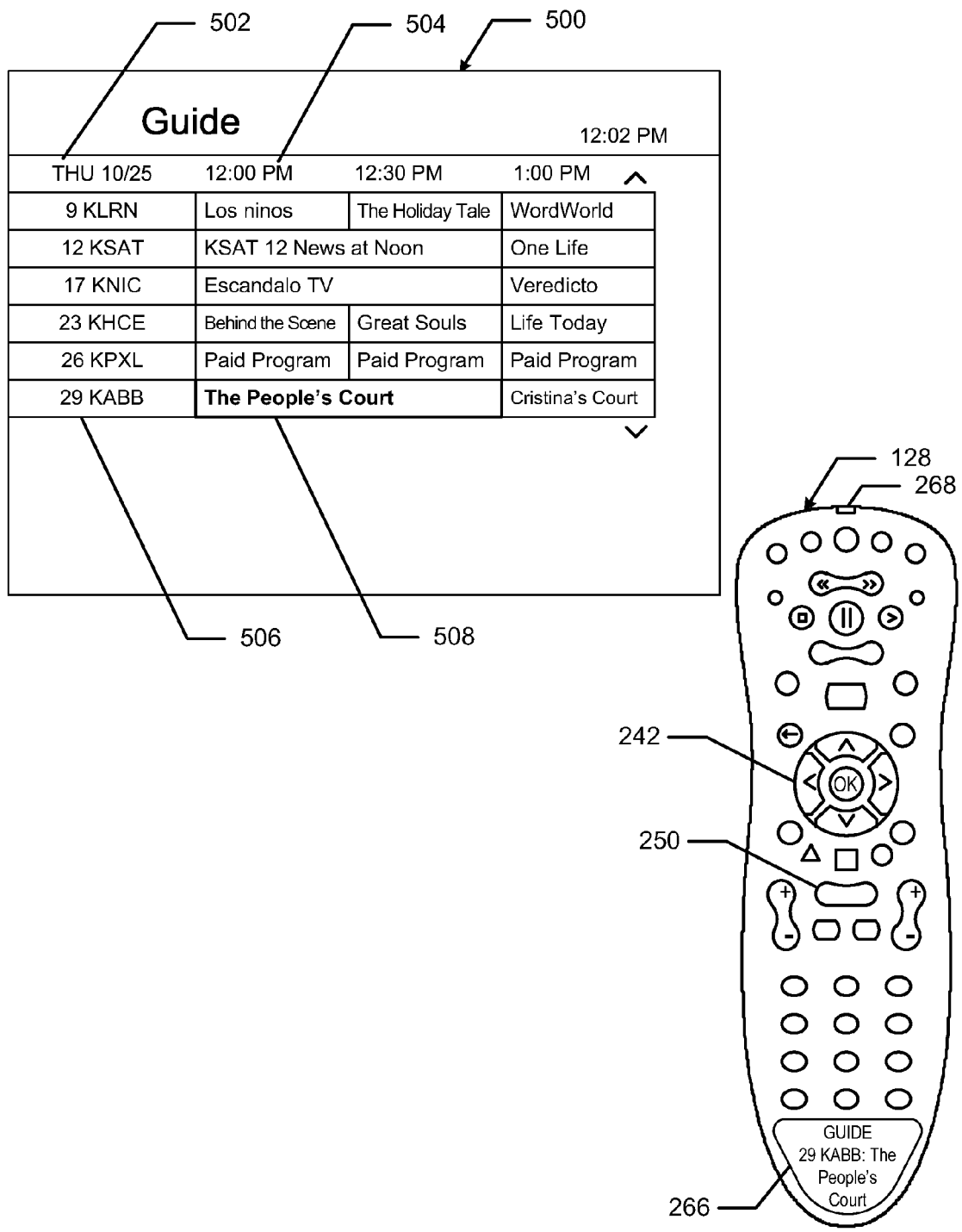
FIG. 5 is an exemplary screen shot of an electronic programming guide and the plan view of the remote control device.

FIG. 5 shows an exemplary screen shot of an electronic programming guide 500 including a date display 502, a viewing time display 504, a channel display 506, and a program title display 508. The date display 502 can indicate a date that the television programs listed in the guide 500 can be provided by the IPTV system 100 to the set-top box device 124. The viewing time display 504 can indicate the time that the television programs listed can be viewed by the user. The channel display 506 can indicate the broadcast channel that provides the television program. The program title display 508 can indicate the name of the television program.

During operation if the user presses the guide button 250, the IR transceiver 268 can transmit a control signal to the set-top box 124 to cause the set-top box to output the guide 500 to the display device 126. The detection module 310 can determine that the guide button 250 was pressed and output 'GUIDE' to the display 266. The user can then press the arrow keys on the directional keypad 242 to scroll through the television programs listed on the guide 500. As a television program is highlighted, the selection module 404 can transmit the television program information associated with the highlighted program to the receiver module 302 via the USB device 406. The receiver module 302 can output the television program information on the display 266. The program title display 508 and the channel display 506 can be included in the television program information and output on the display 266.

Figure 6:
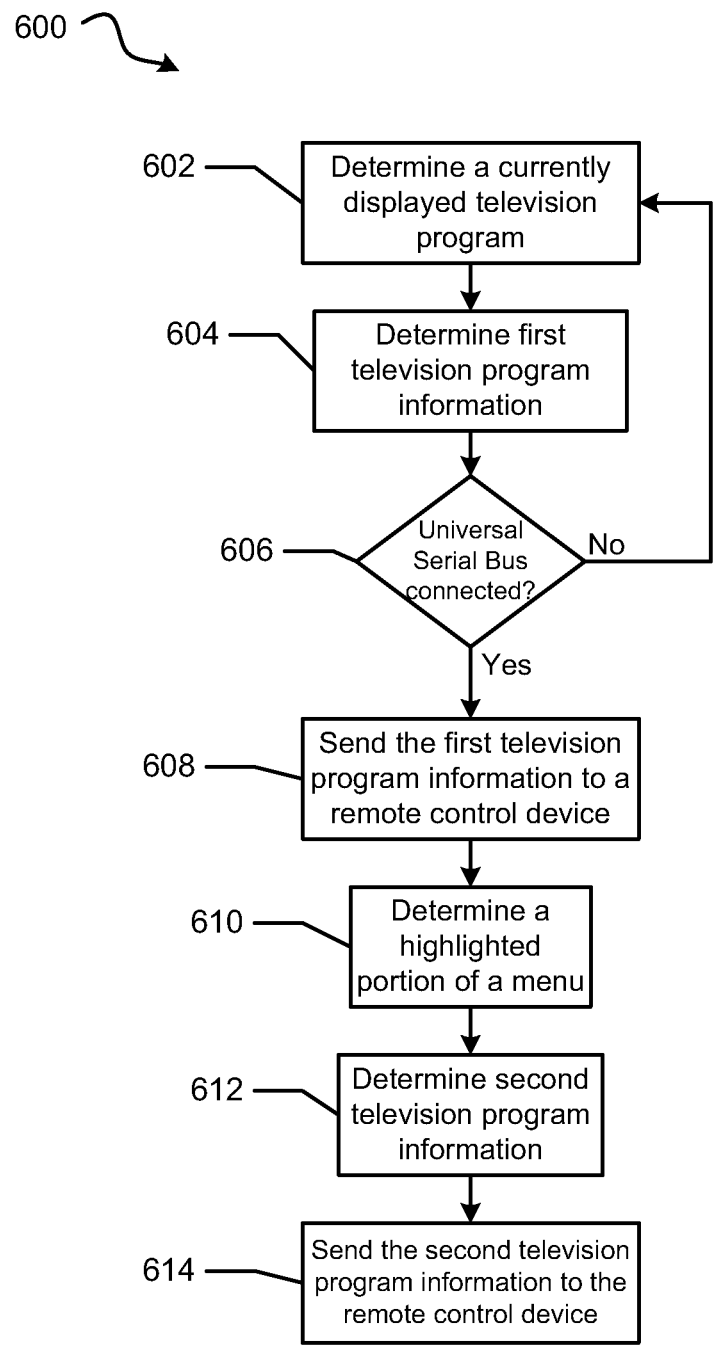
FIG. 6 is a flow diagram of a method for sending television program information about a currently displayed television program to the remote control device.

The set-top box device 124 can determine television program information associated with a currently viewed television program, and send the television program information to the remote control device 128. FIG. 6 shows a flow diagram of a method 600 for sending television program information about a currently displayed television program to the remote control device. At block 602, a currently displayed television program is determined. First television program information associated with the currently displayed television program is determined at block 604. The first television program information can include a broadcast channel number, a broadcast channel name, and a television program title.

At block 606, a determination is made whether a communication module, such an USB device, is connected to the set-top box device. If the USB device is not connected to the set-top box device, then the flow diagram continues as stated above at block 602. If the USB device is connected to the set-top box device, the first television program information is sent to the remote control device at block 608. At block 610, a highlighted portion of a menu is determined. The menu can be an electronic programming guide that a user can browse to determine the different television programs provided by the IPTV system. Second television program information associated with the highlighted portion is determined at block 612. At block 614, the second television program information is sent to the remote control device.

Figure 7:
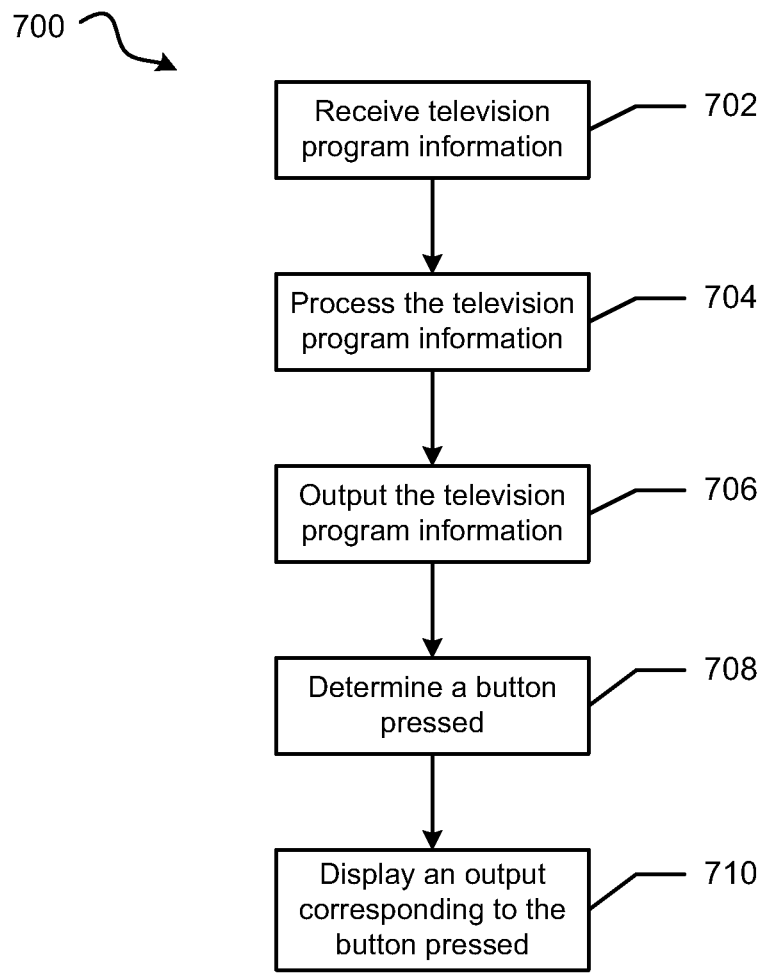
FIG. 7 is a flow diagram of a method for displaying the program information at the remote control device.

The remote control device 128 can display television program information and information related to a button pressed on the remote control device. FIG. 7 shows a flow diagram of a method 700 for displaying television program information on a display of a remote control device. At block 702, television program information is received at the remote control device. The television program information is processed by the remote control device at block 704. At block 706, the television program information is output on the display. The remote control determines a button pressed at block 708. At block 710, an output corresponding to the button pressed is output at the display.

Figure 8:
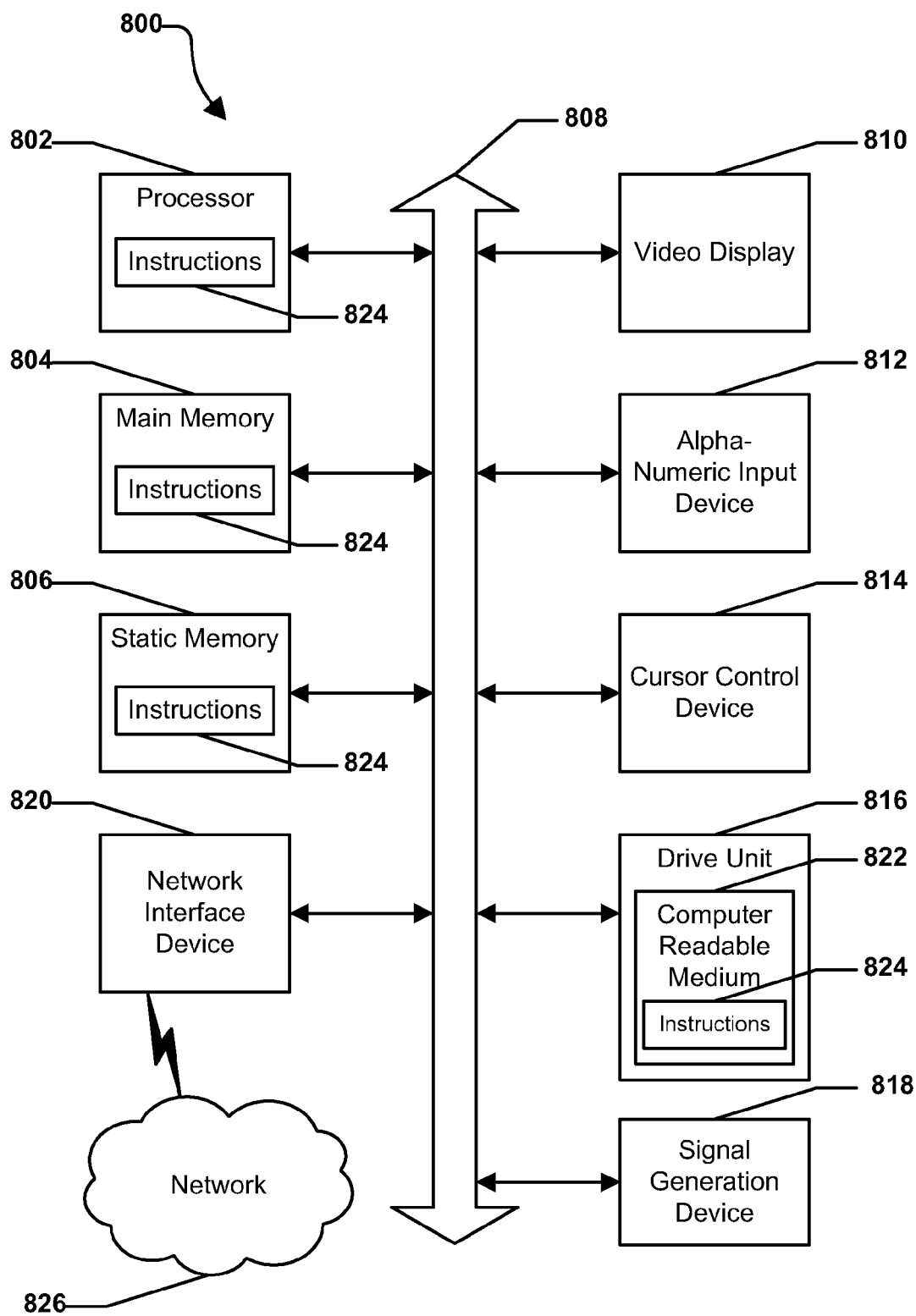
FIG. 8 is a block diagram of a general computer system.

FIG. 8 shows an illustrative embodiment of a general computer system 800 in accordance with at least one embodiment of the present disclosure. The computer system 800 can include a set of instructions that can be executed to cause the computer system to perform any one or more of the methods or computer based functions disclosed herein. The computer system 800 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A set-top box device comprising:
a memory to store instructions; and
a controller coupled to the memory, wherein execution of the instructions by the controller, causes the controller to perform operations comprising:
determining first information associated with first content currently being displayed on a display device communicatively coupled to the set-top box device, wherein the first information includes a broadcast channel number, a broadcast channel name, and a program title of the first content;
determining if a universal serial bus device is connected to the set-top box device, wherein the universal serial bus device wirelessly communicates with a remote control device; and
responsive to the determining that the universal serial bus device is connected to the set-top box device:
receiving, by way of the universal serial bus device, a first control signal from the remote control device, in accordance with detecting a first button pressed at the remote control device, to cause display of an electronic programming guide on the display device;
transmitting the first information to the remote control device by way of the universal serial bus device;
receiving, by way of the universal serial bus device, a second control signal from the remote control device, in accordance with detecting a second button pressed at the remote control device, requesting a change so that second content is displayed on the display device;
determining second information associated with the second content; and
transmitting the second information to the remote control device by way of the universal serial bus device, wherein the second information includes a broadcast channel number, a broadcast channel name, and a program title of the second content;
wherein the remote control device processes the first information and the second information and outputs processed first information and processed second information to a display at the remote control device,
wherein the remote control device determines whether the first button or the second button was pressed and sends an output corresponding to the first button or the second button pressed to the display at the remote control device.

2. The set-top box device of claim 1 wherein the first control signal and the second control signal from the remote control device are received by way of the universal serial bus device.

3. The set-top box device of claim 1 wherein the first information is the electronic programming guide.

4. The set-top box device of claim 1 wherein the first content comprises a first television program and the second content comprises a second television program.

5. The set-top box device of claim 1 wherein the first information is transmitted to the remote control device to display the broadcast channel number, the broadcast channel name, and the program title of the first content on the remote control device.

6. The set-top box device of claim 1 wherein the operations further comprise receiving a third control signal from the remote control device to highlight a portion of the electronic programming guide displayed on the display device.

7. A method comprising:
determining, by a set-top box, first content currently displayed on a screen communicatively coupled to the set-top box;
determining, by the set-top box, first information associated with the first content, wherein the first information includes a broadcast channel number, a broadcast channel name, and a program title of the first content;
determining, by the set-top box, if a universal serial bus device is connected to the set-top box, wherein the universal serial bus device is a wireless device that is removable from the set-top box, and wherein the wireless device wirelessly communicates with a remote control device;
responsive to the determining that the universal serial bus device is connected to the set-top box:
receiving, by the set-top box, a first control signal from the remote control device by way of the universal serial bus device, in accordance with detecting a first button pressed at the remote control device, to cause display of an electronic programming guide on the screen;
sending, by the set-top box, the first information to the remote control device over a wireless connection by way of the universal serial bus device;

receiving, by the set-top box, a second control signal from the remote control device by way of the universal serial bus device, in accordance with detecting a second button pressed at the remote control device, requesting a change so that second content is displayed on the screen;

determining, by the set-top box, second information associated with the second content; and sending, by the set-top box, the second information to the remote control device over the wireless connection by way of the universal serial bus device, wherein the second information includes a broadcast channel number, a broadcast channel name, and a program title of the second content, wherein the remote control device processes the first information and the second information and outputs processed first information and processed second information to a display at the remote control device, wherein the remote control device determines whether the first button or the second button was pressed and sends an output corresponding to the first button or the second button pressed to the display at the remote control device.

8. The method of claim 7 further comprising:

determining if a communication device is connected with the set-top box prior to sending the first information to the remote control device.

9. The method of claim 7 wherein the first information is sent to the remote control device to display the broadcast channel number, the broadcast channel name, and the program title of the first content on the remote control device.

10. A non-transitory computer readable medium comprising a plurality of instructions to manipulate a processor of a set-top box, the plurality of instructions causing the processor to perform operations comprising:

determining first content currently displayed on a screen;

determining first information associated with the first content, wherein the first information includes a broadcast channel number, a broadcast channel name, and a program title of the first content;

determining if a universal serial bus device is connected to the set-top box, wherein the universal serial bus device is a wireless device that is removable from the set-top box, and wherein the wireless device wirelessly communicates with a remote control device;

responsive to the determining that the universal serial bus device is connected to the set-top box:

receiving, over a wireless connection by way of the universal serial bus device, a first control signal from the remote control device, in accordance with detecting a first button pressed at the remote control device, to cause display of an electronic programming guide on the screen;

sending the first information to the remote control device;

receiving, by way of the universal serial bus device, a second control signal from the remote control device, in accordance with detecting a second button pressed at the remote control device, requesting a change so that second content is displayed on the screen;

determining second information associated with the second content; and sending the second information to the remote control device over the wireless connection by way of the universal serial bus device, wherein the second information includes a broadcast channel number, a broadcast channel name, and a program title of the second content, wherein the remote control device processes the first information and the second information and outputs processed first information and processed second information to a display at the remote control device, wherein the remote control device determines whether the first button or the second button was pressed and sends an output corresponding to the first button or the second button pressed to the display at the remote control device.

11. The non-transitory computer readable medium of claim 10 wherein the operations further comprise:

receiving a third control signal from the remote control device to highlight a portion of the electronic programming guide displayed on the screen.

12. The non-transitory computer readable medium of claim 10 wherein the first information is sent to the remote control device to display the broadcast channel number, the broadcast channel name, and the program title of the first content on the remote control device.

13. The non-transitory computer readable medium of claim 11 wherein the first information is the electronic programming guide.

14. The non-transitory computer readable medium of claim 10 wherein the first content comprises a television program.

* * * * *